United States Patent Office 2,951,045

Patented Aug. 30, 1960

2,951,045

PREPARATION OF TITANIUM CHLORIDE POLYMERIZATION CATALYST

Leon Walter Gamble, Arthur Walter Langer, Jr., and Arthur Homer Neal, Baton Rouge, La., assignors to Esso Research and Engineering Company, a corporation of Delaware No Drawing. Filed May 10, 1957, Ser. No. 658,221

5 Claims. (Cl. 252—429)

This invention relates to an improved process for preparing a reduced titanium chloride polymerization catalyst and to the use thereof in polymerization reactions. More particularly it relates to the preparation of a violet titanium chloride catalyst by reducing titanium tetrachloride with the aid of an aluminum trialkyl in stages at progressively higher temperatures.

The polymerization of propylene with the aid of Ziegler catalysts, e.g. a reduced titanium chloride activated with an aluminum alkyl compound, has been rapidly gaining in importance. However, the preparation of the required catalyst has been subject to various drawbacks, especially with regard to catalyst activity and reproducibility. This has been especially true with regard to the preferred highly crystalline, violet titanium trichloride modification, as distinguished from the more amorphous, brown titanium chloride modification.

It is an object of the present invention to provide an improved process for reducing titanium tetrachloride to the preferred violet catalyst modification. A more particular object is to improve the utilization of the principal catalyst components in preparing the active violet titanium chloride catalyst by reduction of titanium tetrachloride with the aid of an aluminum trialkyl compound. Still another object is to provide a catalyst adapted to produce a high yield of high quality polypropylene plastic per weight of catalyst. These and other objects, as well as the nature, scope and operation of the invention will become more clearly apparent from the subsequent description and examples. It will be understood that all quantities and proportions of materials are expressed throughout on a weight basis, unless indicated otherwise.

An unusually efficient process has now been discovered for preparing a highly active titanium chloride catalyst by reduction of aluminum trialkyls. More particularly this process involves mixing titanium tetrachloride with a substantially stoichiometric amount of aluminum triethyl or other aluminum trialkyl of 2 to 4 carbon atoms per alkyl group, e.g. aluminum tri-n-butyl or aluminum triisobutyl, while in relatively dilute solution at a moderate temperature and heating the mixture slowly or after a substantial interval to higher temperatures. In this manner the amount of titanium compound precipitated is maximized and produced in a highly active form. A particularly preferred embodiment involves carrying out the catalyst preparation at three progressively higher temperature levels. By contrast, when the catalyst preparation is made entirely at a relatively high temperature, or even if the catalyst components are mixed at low temperature but thereafter rapidly heated to a higher temperature as has been previously suggested, a substantially less active catalyst is prepared due to the fact that the aluminum trialkyl tends to cause overreduction of a portion of the titanium tetrachloride, e.g. to the relatively inactive titanium dichloride, while other portions of the titanium tetrachloride remain in their unreduced, catalytically inactive form. The graded heating schedule of the present invention overcomes this inefficient use of the reducing agent in that it makes substantially full use of the reducing powers of the aluminum trialkyl in stages such that each of the three alkyl groups is utilized more or less in succession. More particularly, in the present invention the reducing powers of the most potent, first alkyl groups of the aluminum trialkyl compound are utilized at a relatively low temperature at which the reducing potential of the two other alkyl groups remains essentially inactive and thus maintains a relatively low ratio of active reducing agent to reducible compound in the mixture. Only when the trialkyl compound has thus been substantially completely converted to the less potent aluminum dialkyl chloride or alkyl dichloride, is the temperature of reaction progressively increased to make use of the remaining reducing potential of these less powerful aluminum alkyl compounds.

Since each of these three alkyl groups in the aluminum trialkyl has different energies of activation for the reduction of titanium tetrachloride, the reduction of titanium tetrachloride to trichloride with the aid of aluminum triethyl ($3TiCl_4+AlEt_3 \rightarrow 3TiCl_3+AlCl_3$) may be considered as the sum of three reactions:

(1) $TiCl_4+AlEt_3 \rightarrow TiCl_3+AlEt_2Cl$ (temp. about −50° C. up);

(2) $TiCl_4+AlEt_2Cl \rightarrow TiCl_3+AlEtCl_2$ (temp. about 30° C. up);

(3) $TiCl_4+AlEtCl_2 \rightarrow TiCl_3+AlCl_3$ (temp. about 70° C. up).

By carrying out the reduction with suitably graded heating in accordance with the present invention, the overall reaction is effected in stages more or less corresponding to the reactions listed above. Thus, the ratio of available reducing agent to reducible titanium halide is at all times much lower here than when the reduction is carried out at a temperature high enough to activate two or more of the three alkyl groups of the original trialkyl compound at once. Consequently, the present invention minimizes undesirable overreduction while yet permitting the formation of the active titanium trichloride in a highly effective manner.

Accordingly, in the present invention it is desirable to mix titanium tetrachloride and aluminum triethyl in substantially stoichiometric proportions, i.e., in proportions corresponding to an Al/Ti ratio in the range between about 0.3/1 and about 0.4/1, preferably between 0.33/1 and 0.36/1. The initial mixing and reduction is done at a relatively low temperature, e.g. between about 0° and 40° C., preferably 25° to 35° C., this temperature being maintained until the aluminum trialkyl is substantially converted to the corresponding aluminum dialkyl chloride. The time required for this stage varies somewhat depending on the actual temperature and nature and concentration of reagents employed, but in general will be in the range of about 2 to 60 minutes. Periods of about 15 to 45 minutes are preferred at temperatures of 25° to 35° C. and at catalyst concentrations of about 10 to 25 grams of total metal compounds per liter of inert diluent. Of course, the optimum reaction time for any given set of temperature and concentration conditions can be readily determined by routine tests. About 20 to 40% of the initially dissolved titanium should be precipitated in this first, low temperature stage. The temperature-graded catalyst preparation of this invention can be effected either batchwise or in a continuous manner. In either event, agitation of the reaction mixture is desirable.

When the desired first-stage reduction has been completed to the desired extent, the mixture is further heated, gradually or in stages, until a final temperature of about 110° to 175° C., preferably 120° to 140° C. in the case of aluminum triethyl, is reached. At temperatures below 110° C. the aforesaid Reaction 3 proceeds at a relatively slow rate and in addition the resulting precipitated catalyst tends to be in the amorphous brown form rather than the preferred crystalline, violet form. When using aluminum tripropyl or tributyl instead of triethyl, it may be desirable to conduct the reduction at somewhat higher temperatures subsequent to the first, low-temperature stage. While the activation energy of the first alkyl radical is substantially the same in the case of all of these aluminum trialkyls the activation energies of the other two alkyl groups are somewhat higher for propyl and butyl groups than for the ethyl groups.

Of course, the heating necessary to accomplish the reduction corresponding to Equations 2 and 3 can be effected in various ways. For instance, upon completion of the first reduction stage the temperature of the mixture may be raised gradually over a period of about 30 to 180 minutes until the desired end temperature and degree of reduction is reached, the total time required again being somewhat dependent on the catalyst concentration, kind of aluminum alkyl compound and the specific heating schedule. Alternately, the mixture pre-reduced in the first stage may be raised fairly rapidly to a temperature in the 110° to 145° C. range and maintained there until the reduction is completed, always provided, however, that the first stage reduction was allowed to proceed long enough to convert substantially all of the aluminum trialkyl into the less potent aluminum alkyl chlorides at a low temperature. Otherwise the rapid heating schedule may cause over-reduction and thereby impair the final catalyst quality. The preferred preparation involves maintaining the mixture of titanium tetrachloride and aluminum triethyl at a total concentration of 45 g./l. in an initial mixing-reduction stage for about 20 to 40 minutes at a temperature of about 30 to 35° C., then raising the temperature of the mixture to about 60° to 70° C. and maintaining it at this second-stage temperature for another 20 to 45 minutes, and finally heating the mixture to a temperature of about 120 to 125° C. and maintaining it at this third-stage temperature until the desired reaction is completed, e.g. for another 45 to 90 minutes.

Of course, as is otherwise well known in the art, the titanium tetrachloride and the aluminum trialkyl are mixed while each of these compounds is dissolved in an inert hydrocarbon solvent. Suitable solvents include $C_5$ to $C_{12}$ or higher saturated or aromatic hydrocarbons, e.g. isopentane, n-heptane, n-dodecane; highly refined (acid treated) kerosene or white oil; essentially isoparaffinic alkylate bottoms such as the bottoms fraction (boiling range about 160° to 215° C.) obtained in making aviation gasoline by alkylation of isobutane with propylene, butenes or amylenes; also cyclohexane, methylcyclohexane, decalin, benzene, xylene, etc. Isopentane, n-heptane and alkylate bottoms are particularly preferred. If the solvent is sufficiently high boiling, the reduction may be effected at atmospheric pressure. Otherwise the reduction is conducted under high enough pressure to maintain the solvent liquid.

In the catalyst preparation it is desirable to have the metal compounds present in concentrations of 0.5 to 8% each, preferably about 0.75 to 3.0%. In other words, the catalyst preparation may be conducted with reaction mixtures containing about 10 to 100 grams of total metal compounds per liter of solvent. Relatively low concentrations of the aluminum trialkyl solution, e.g. about 0.1 molal or less, are particularly helpful as an additional safeguard against overreduction, although when the concentration is reduced below about 0.5%, the desired catalyst reduction is apt to become too slow. Conversely, at high concentrations the resulting catalyst slurry becomes increasingly difficult to handle and the danger of over-reduction is increased as well. It will be understood, however, that it is possible to start with dilute solutions of the two catalyst components, or to add relatively concentrated solutions of these components to a large body of solvent calculated to give the desired metal compound concentration in the resulting mixture.

In the catalyst preparation as well as the polymerization it is desirable to use solvents and reagents essentially free of impurities such as oxygen, moisture, sulfur, certain aromatics, acetylenes, etc., since these tend to poison the catalyst or affect polymer quality. For instance, oxygen and water in the reaction diluent are desirably held to less than 5 p.p.m. as they not only tend to poison the catalyst but also convert a portion of the catalyst into insoluble compounds that cause an increase in the ash content of the polymer product. Except where some specific product modification is intentionally desired, the feed olefin or olefins also should be substantially free of homologous olefins as these may have a substantial effect on product quality. On the other hand, substantial amounts of paraffins may be tolerated in the olefin feed stream without harm. Thus, essentially the same results can be obtained when using technical grade propylene containing as much as 5% or even 10% propane, as when pure propylene is used in the polymerization. Purification of the solvents and feed olefins may be effected by fractional distillation, distillation in the presence of metallic sodium, percolation through activated silica or alumina, the olefin feed may be scrubbed with aluminum alkyl solutions, etc. In some cases molecular sieves may be used. Of course, the catalyst preparation as well as the olefin polymerization is desirably carried out in an inert, oxygen-free atmosphere, which can be achieved by flushing the pertinent equipment with nitrogen, methane or similar dry inert gases.

Upon completion of the catalyst preparation, it may be used immediately for polymerizing olefins such as propylene, or it may be stored for extended periods prior to such use, provided that an inert environment is maintained during storage.

In or shortly prior to use of the catalyst in the polymerization it is desirably activated by increasing its Al/Ti ratio to a range between about 1/1 and 3/1. This is done by adding an appropriate supplemental amount of the aluminum trialkyl, e.g. aluminum triethyl or a dialkyl halide, e.g. aluminum diethyl chloride, which tends to activate the precipitated reduced titanium chloride. In the polymerization stage this catalyst is mixed with the polymerizable olefin and usually also with additional amounts of inert diluent of the aforementioned kind, since in the polymerization stage it is desirable to operate at relatively low catalyst concentrations, e.g. about 0.05 to 0.5%, preferably 0.10 to 0.25%, based on total liquid present. Of course, the optimum catalyst concentration will depend somewhat on the amount and kind of impurities present, the desired molecular weight of the product, etc. The polymerization mixture desirably contains about 2 to 20%, preferably 3 to 10% olefin monomer. The monomer concentration may be at least partially controlled by means of the pressure, maintained in the polymerization zone. This pressure may be in the range of about 0 to 500 p.s.i.g., preferably about 0 to 150 p.s.i.g., somewhat depending on the polymerization temperature. The polymerization temperature is desirably maintained between about 0° and 100° C., preferably between about 50° and 85° C.

After the required residence time, e.g. 20 to 180 minutes, the reaction mixture may be passed from the polymerization reactor in conventional manner to a quench tank where it is mixed with a $C_1$ to $C_8$ alkanol, e.g. methanol, n-butanol or isooctyl alcohol, the resulting precipitated solid polymer is filtered from the organic liquid, washed with methanolic hydrochloric acid solution, an alcoholic solution of a chelating agent such as acetyl acetone or the like to remove catalyst residues, dried, compacted and packaged. The polymer typically has a molecular weight between about 20,000 and 1 million, as determined from intrinsic viscosity measurements of its solutions. Polymers in the 50,000 to 150,000 molecular weight range generally are considered as possessing a particularly attractive balance of properties.

The invention will next be illustrated by specific examples.

EXAMPLE 1

Four comparative runs were made in a continuous polymerization plant, using propylene gas as the polymerizable feed. All polymerizations were carried out in heptane diluent at a pressure of 100 p.s.i.g. The propylene concentration in the liquid polymerization mixture was 10% on diluent. All catalysts were prepared in individual batches at a concentration of 45 grams of total metal compounds per liter of heptane diluent, the two catalyst components being mixed in a ratio equivalent to a mole ratio of 0.36 Al/Ti. The $AlEt_3$ was in the form of a 0.10 molar solution in heptane. Titanium tetrachloride was in the form of a 0.60 molar solution in heptane. The aluminum alkyl solution was added to the titanium chloride solution. However, in runs 1 and 2 the catalyst was prepared in accordance with prior practice by mixing the titanium tetrachloride and aluminum triethyl solutions at 22° C. and rapidly heating the mixture to 140° C. This required about 10 minutes. Thereafter the mixture was held at 140° C. for one hour, and then cooled to room temperature in 10 minutes. On the other hand, the catalyst used in runs 3 and 4 was prepared in accordance with the instant invention. The $TiCl_4$ and $AlEt_3$ solutions were mixed at 32° C., the mixture maintained at that temperature for 30 minutes, then the temperature was raised slowly over a period of about 30 minutes to 65° C. and maintained at that temperature for an additional 30 minutes, and finally the mixture was heated to 121° C. in another 30-minute interval and held there for one hour. Thereafter the mixture was cooled sharply to room temperature.

After cooling, the respective catalytic mixture was fed into the continuous polymerization reactor together with additional $AlEt_3$ solution sufficient to raise the Al/Ti mole ratio to about 2/1. Also, additional heptane was fed into the system at a rate sufficient to maintain the catalyst concentration in the reactor at about 0.1 to 0.2% based on diluent, as indicated. Propylene (95% $C_3H_6$, 5% $C_3H_8$) was introduced at a rate equal to 10 wt. percent monomer in the feed to the polymerization zone. The pressure was about 100 p.s.i.g. The details of the four runs are summarized in Table I.

*Table I*

PROPYLENE POLYMERIZATION WITH VIOLET $TiCl_3$ CATALYST

| Run No. | 1 | 2 | 3 | 4 |
|---|---|---|---|---|
| Polymerization Conditions: | | | | |
| Cat. Con., percent on diluent | 0.12 | 0.23 | 0.18 | 0.19 |
| Al/Ti mole ratio | 2.0 | 1.2 | 2.1 | 2.1 |
| Reaction Temp., °C | 65 | 69 | 67 | 68 |
| Run Length, Hours | 9 | 8 | 19 | 21 |
| Normal Reactor Residence, Hours | 0.9 | 0.9 | 0.84 | 0.85 |
| Polymerization Results: | | | | |
| Catalyst Efficiency, w./w. | 10 | 20 | 40 | 44 |
| Reaction Rate, w./hr./w. | 11 | 23 | 47 | 52 |
| Conversion, percent | 12 | 48 | 77 | 85 |
| Polymer Properties: | | | | |
| Heptane Insol., percent | 58 | 37 | 63 | 60 |
| Int. Vis., dl./g. | 2.87 | -------- | 1.72 | 1.67 |
| Melt Index, g./10 min. | 0.1 | 0.57 | 1.61 | 2.60 |
| Density, g./cc. | 0.882 | 0.884 | 0.890 | 0.885 |

Comparison shows that the catalyst prepared according to this invention (runs 3 and 4) produced about two to four times more polymer product per weight of catalyst than was obtainable with the prior art catalyst preparation of runs 1 and 2. The monomer conversion also was very much greater in runs 3 and 4 than in runs 1 and 2. In addition, the slurries obtained in Examples 3 and 4 were more fluid than those in 1 and 2.

EXAMPLE 2

A series of catalyst preparations was made at various temperatures to illustrate the effect of temperature on the amount of precipitate formed when titanium tetrachloride is reduced with aluminum triethyl. The amount of precipitated titanium is, of course, indicative of the amount of active catalytic material made available from a given amount of catalytic components. The amount of total titanium in each given precipitate was measured by analysis.

In each of these tests a solution of 0.5 M $AlEt_3$ in alkylate bottoms (B.R. 160° C. to 215° C.) was added to a solution of 0.083 M $TiCl_4$ in the same alkylate bottoms in an oxygen-free reactor in a ratio of 0.33 mole of $AlEt_3$ per mole of $TiCl_4$. The resulting concentration was about 20 grams of total metal compounds per liter. The mixture was then rapidly heated at atmospheric pressure in about 15 minutes to the temperature indicated, held therefor one hour, and rapidly cooled. The resulting precipitate was separated from the liquid by filtration under nitrogen, vacuum dried and the titanium content of the precipitate determined by analysis. The results are summarized in Table II.

*Table II*

EFFECT OF TEMPERATURE ON PRECIPITATION OF TITANIUM

| Temperature, ° C. | Titanium Precipitate, Percent of Charge | Color of Precipitate |
|---|---|---|
| 27 | 40 | Brown. |
| 52 | 68 | Do. |
| 72 | 85 | Do. |
| 116 | +98 | Violet. |
| 140 | 93 | Do. |
| 163 | 80 | Do. |

It is apparent that the preferred, crystalline form of titanium trichloride is formed only at temperatures somewhere above 75° C. Also at the lower temperatures the "theoretical" amount of $AlEt_3$ is not sufficient to reduce all the $TiCl_4$ to $TiCl_3$, inasmuch as the complete reducing potential of all three alkyl groups is not available at the lower temperatures. Moreover, it is apparent that as the reaction temperature is increased the yield of precipitated catalyst goes through a maximum in the 110° to 145° C. range. However, the amount of precipitate decreases at a surprisingly rapid rate when the temperature of about 115° C. is exceeded in this rapid heating schedule. This is evidence that when the high temperatures required for forming violet $TiCl_3$ are reached rapidly, rather than gradually, the trialkyl tends to over-reduce a part of the titanium tetrachloride to the undesirable dichloride while leaving other portions of the tetrachloride unreduced. This was further confirmed by analyzing the filtrates from the foregoing tests for titanium. These results are summarized in Table III.

*Table III*

EFFECT OF TEMPERATURE ON UNREACTED $TiCl_4$

| Temperature, °C. | $TiCl_4$ in Filtrate, Percent of Total |
|---|---|
| 140 | 5 |
| 163 | 25 |

It is apparent that as the mixture is rapidly heated during the catalyst preparation to temperatures above 140° C., the amount of titanium halide that remains in soluble form in the final catalyst mixture increases quite rapidly. Such soluble $TiCl_4$ is well known to be deleterious to catalyst and polymer properties. The above results are, of course, consistent with Table II which shows, as a corollary, that rapid heating to high temperatures reduces the amount of catalytic titanium precipitate.

EXAMPLE 3

In still another set of tests the relative reducing effectiveness of $AlEt_3$, $AlEt_2Cl$ and $AlEtCl_2$ were compared. For this purpose 0.02 M solutions of $TiCl_4$ and the aluminum alkyl compound in heptane were mixed to give an Al/Ti mole ratio of 1/1 and the resulting mixtures were maintained at various temperatures for certain periods. Thereafter the amount of titanium in the respective catalytic precipitates was determined. The results are summarized in Table IV.

*Table IV*

REDUCING ABILITY OF VARIOUS ALKYL GROUPS IN ALUMINUM ETHYL COMPOUNDS

| Reducing Agent | Temperature, ° C. | Holding Time, Minutes | Precipitated Titanium, Percent of Total |
|---|---|---|---|
| $AlEt_3$ | −50 | 15 | 35 |
| $AlEt_3$ | −20 | 15 | 70 |
| $AlEt_3$ | +40 | 15 | 100 |
| $AlEt_2Cl$ | +40 | 15 | 10 |
| $AlEt_2Cl$ | +50 | 15 | 20 |
| $AlEt_2Cl$ | +70 | 15 | 50 |
| $AlEt_2Cl$ | +40 | 60 | 35 |
| $AlEt_2Cl$ | +70 | 60 | 90 |
| $AlEtCl_2$ | +80 | | [1] 10 |
| $AlEtCl_2$ | +120 | | [1] 50 |

[1] Estimated from qualitative observations.

The above clearly demonstrates the great difference in reducing ability of the several aluminum alkyl compounds. In the case of $AlEt_3$ substantially complete reduction of the titanium tetrachloride is obtained in 15 minutes at 40° C. Consequently, if undesirable over-reduction is to be avoided, it seems preferable in this case to operate at temperatures below about 35° C. and to use reaction times appropriately short for any given reaction temperature. In the case of $AlEt_2Cl$, which in effect corresponds to the second-stage reaction of this invention, considerably higher reaction temperatures or heating times, or preferably a combination of the two, is required to give efficient reduction of the soluble titanium chloride to its insoluble catalytic form. Of course as stated earlier herein, final catalyst preparation temperatures above 110° C. are actually required in order to produce the highly crystalline, violet form of $TiCl_3$.

Having described the general nature of the invention and illustrated it by specific examples, its novelty is particularly pointed out in the appended claims.

The claimed invention is:

1. A process for making a polymerization catalyst which comprises mixing an aluminum trialkyl of 2 to 4 carbon atoms per alkyl group and titanium tetrachloride in substantially stoichiometric proportion while in a hydrocarbon solution in a total concentration of about 1.0 to 16% at a temperature not above 40° C., maintaining the mixture in the aforesaid temperature range for about 2 to 60 minutes until about 20 to 40% of the original soluble titanium is precipitated from the solution, and then heating the mixture to a final temperature of about 110° to 175° C. to produce a violet catalytic precipitate.

2. A process according to claim 1 wherein the mixture is maintained in the initial treating step at a temperature of about 25° to 35° C. for about 15 to 45 minutes and wherein the aluminum trialkyl and titanium tetrachloride solutions are used in concentrations to yield about 10 to 100 g. of total metal compounds per liter of diluent, said diluent being an aliphatic hydrocarbon of at least 5 carbon atoms and boiling between about 20° and 250° C.

3. A process according to claim 1 wherein trialkyl compound is aluminum triethyl and wherein the catalyst mixture is raised to a temperature between 110° and 125° C. in stages after completion of the first treating stage.

4. A process for making a polymerization catalyst which comprises adding at a temperature of about 25° to 35° C. a heptane solution of aluminum triethyl to a heptane solution containing titanium tetrachloride, the two solutions being admixed in a proportion calculated to give an Al/Ti mole ratio between about 0.3/1 and 0.4/1 and in concentrations to produce a mixture containing 30 to 70 grams of metal compounds per liter, maintaining the mixture in the aforesaid temperature range for 15 to 45 minutes, next heating the mixture to a temperature between about 60° and 70° C. and maintaining it at this temperature level for another 20 to 45 minutes, and finally heating the mixture to a temperature of about 120° to 125° C. and maintaining it at this third-stage temperature until substantially all of the initial aluminum alkyl compound is converted to aluminum trichloride.

5. The process of claim 1 wherein the violet catalytic precipitate is activated with an aluminum alkyl compound selected from the group consisting of aluminum triethyl and aluminum diethyl chloride to increase its Al/Ti ratio to a range between 1/1 and 3/1.

References Cited in the file of this patent

UNITED STATES PATENTS

| | | |
|---|---|---|
| 2,721,189 | Anderson | Oct. 18, 1955 |
| 2,839,518 | Brebner | June 17, 1958 |

FOREIGN PATENTS

| | | |
|---|---|---|
| 533,362 | Belgium | Nov. 16, 1955 |

OTHER REFERENCES

"J. Organic Chemistry," vol. 10 of 1945, pp. 505–515.